(No Model.)

E. R. & C. W. KNECHT.
ANIMAL TRAP.

No. 480,593. Patented Aug. 9, 1892.

WITNESSES:
Chas. Nida.
C. Sedgwick

INVENTORS
E. R. Knecht
C. W. Knecht
BY Munn & Co.
ATTORNEYS.

UNITED STATES PATENT OFFICE.

EDWIN R. KNECHT AND CHARLES W. KNECHT, OF SHELBYVILLE, ILLINOIS.

ANIMAL-TRAP.

SPECIFICATION forming part of Letters Patent No. 480,593, dated August 9, 1892.

Application filed January 5, 1892. Serial No. 417,105. (No model.)

*To all whom it may concern:*

Be it known that we, EDWIN R. KNECHT and CHARLES W. KNECHT, of Shelbyville, in the county of Shelby and State of Illinois, have invented a new and useful Improvement in Animal-Traps, of which the following is a full, clear, and exact description.

Our invention relates to an improvement in traps, especially to traps adapted for catching small animals, such as rats and mice; and the object of the invention is to so construct the device that when the trap is set the animal may pass in at one end and see out through the trap at the opposite end, and whereby either end may be entered and the bait be visible from any portion of the trap.

Another object of the invention is to provide a means whereby the bait, however visible, cannot be taken by an animal entering the trap, and whereby when the bait is approached the animal will be dropped from that portion of the trap he has entered and will fall into a lower or prison compartment, from whence the animals may be removed at will.

A further object of the invention is to so construct the trap that its parts may be placed in such a position as to allow animals to run safely through from end to end, and thereby familiarize themselves with the trap and be satisfied that there is no danger in it. By this means animals will enter the trap without hesitancy when set to take the bait therefrom.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
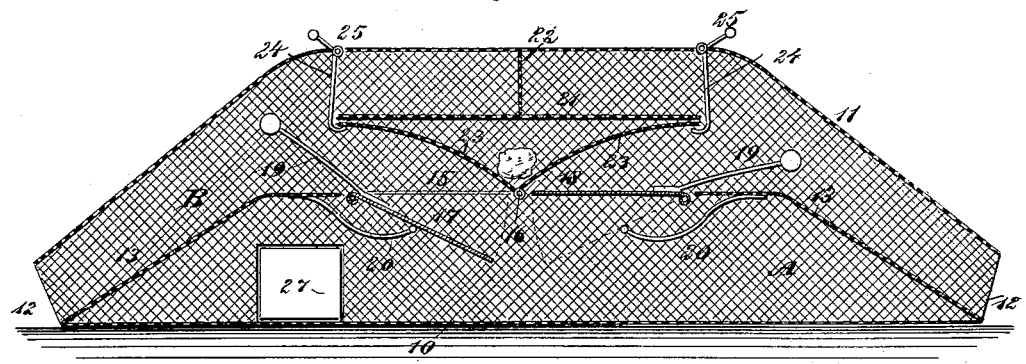
Figure 2:
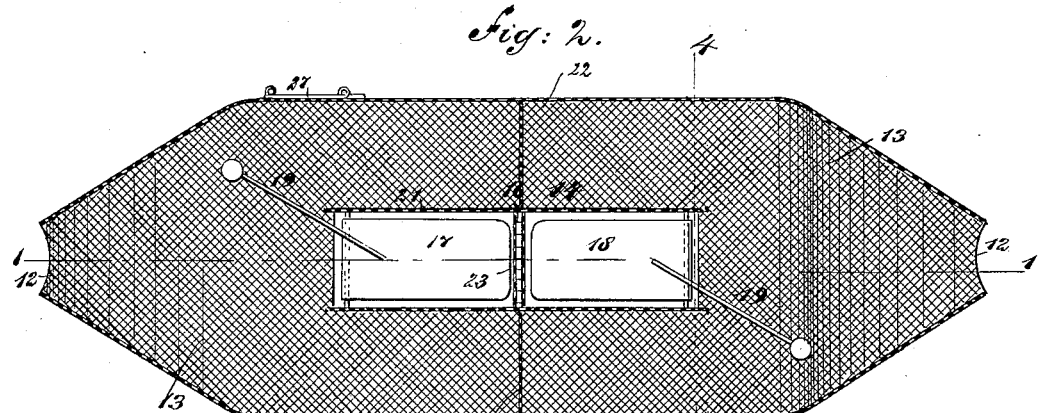
Figure 3:
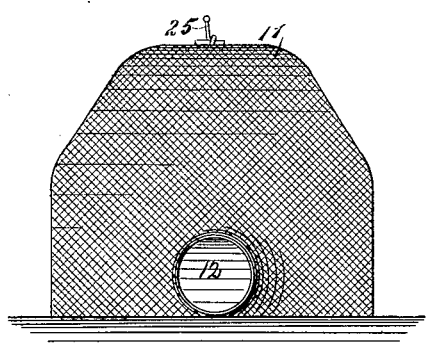
Figure 4:
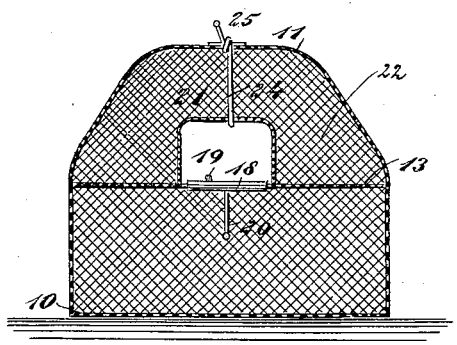

Figure 1 is a longitudinal vertical section through the trap, the said section being taken practically on the line 1 1 of Fig. 2. Fig. 2 is a horizontal section taken immediately above the trap-door. Fig. 3 is an end view of the trap, and Fig. 4 is a transverse section taken practically on the line 4 4 of Fig. 2.

The trap is constructed of perforated material or entirely of wire, as may be found desirable. Preferably, however, wire is the material used. The body of the trap is provided with a flat bottom 10 and a practically oval top 11, the lower sides being substantially straight, as shown in the cross-section in Fig. 4, and the extremities of the trap are contracted—that is to say, the body is so shaped that from a point each side of the center it is beveled or inclined downward in the direction of the center at the ends—and in each end of the trap an opening 12 is provided, the said openings being usually circular, as shown in Fig. 3.

A horizontal partition 13 is located in the trap, extending from side to side and from end to end. The central portion of this partition is straight and purely horizontal, while the ends follow the inclination of the end portions of the body of the trap. By this means two compartments are produced—a lower compartment A, adapted as a prison-compartment, and an upper trap-compartment B. The ends of the partition 13 are so carried downward that they preferably touch the bottom at the base portion of the end openings. Thus if this partition were solid or unbroken throughout its length an animal entering at one end could readily pass through the trap and pass out at the other end, and an animal at one end of the trap can readily see through to the opposite end; but in the central portion of this partition 13 an opening 15 is made. Transversely at the central portion of this opening a pivot-pin 16 is located, and at each side of this pivot-pin a trap-door is pivoted, the said trap-doors being designated by the reference-numerals 17 and 18. One door is independent of the other, the free ends of the doors being the inner ends and the outer ends the pivotal ones. Each door is counterbalanced in such a manner as to maintain it normally in a horizontal or closed position, this counterbalancing being preferably effected through the medium of arms 19, attached to the upper surfaces of the doors and extending diagonally out therefrom in opposite directions, the said arms being provided at their extremities with weights, as is shown in Figs. 1 and 2. The doors are prevented from opening downward for too great a distance through the medium of stop-arms 20, secured to the under face of the partition 13, and said stop-arms are curved downward and upward beneath and within a suitable distance from the trap-doors when the latter are in their normal position. In Fig. 1 one of the doors 17 is illustrated as pressed downward and as engaging with the stop. The other door 18 is in its closed or normal position.

An arch-shaped casing 21 is secured upon the upper surface of the partition 13 at the center thereof in such a manner as to cover the trap-doors 17 and 18, and this casing extends practically the length of the true horizontal portion of the partition 13, but does not extend through to the sides of the trap. The animals are prevented from passing through the trap at the sides of the arched casing by erecting a vertical transverse partition 22 at or near the center of the trap, extending from the sides of the arched casing to the sides of the trap-body within the compartment B, and from the top of the arch-casing to the top of the body. Thus animals entering the trap at one end can escape at the opposite end by passing through the runway or alley formed by the casing 21 and over the trap-doors therein.

Upon the pivot 16 two cover-doors 23 are hinged. These doors we denominate "cover-doors," as they are adapted to cover or bridge over the trap-doors, when so desired, to permit animals to run unharmed from end to end of the trap. These cover-doors 23 extend upward and outward in opposite directions from their pivot, and are consequently curved, as is best shown in Fig. 1, the doors being of sufficient length to enable them when carried to their lowermost position to rest at their free ends upon the partition 13. When the trap is set, these doors are lifted until their free ends engage with the top of the arch, as illustrated in Fig. 1, and are maintained in this position by any suitable form of catch, that shown in the drawings consisting of hooks 24, which are pivoted at their upper ends to the casing or body of the trap and at their lower ends are adapted to engage with the outer ends of the cover doors. These hooks are provided with weighted arms 25 at their upper ends, the said arms serving to maintain the hooks in engagement with the cover-doors, and also serving as a means whereby a disengagement of the hooks and the doors may be accomplished. It will be observed that the cover-doors are located within the arch or runway 21, and the bait when the trap is set is placed between the two doors, resting upon both, as shown in Fig. 1. Thus the bait is visible from all portions of the trap; but is not at all accessible to the animal while the cover-doors are in their elevated position, as said doors extend from side to side of the arch or runway. An animal entering the trap can see the bait from all points therein, and after trying in vain to reach it from points outside of the arched casing will finally enter the latter. As soon as this portion of the trap is entered the animal treads upon one of the trap-doors 17 or 18, and the weight of the animal will force the door downward, causing the animal to fall into the lower or prison compartment A. As soon as the door is relieved of the animal's weight, by reason of its attached counterpoise arm it is restored to its normal position.

A door 27 is usually provided in one wall of the lower or prison compartment, through which opening the animals are suffered to pass out, or through which they are taken out.

When the cover-doors are in their lowermost position, they may be elevated so as to be engaged by the hooks 24 in many ways, and we do not confine ourselves to any particular device for effecting this result. The doors may be readily engaged by their latches, however, by turning the trap upside down, and when the cover-doors are in engagement with the roof of the arch or runway 21 they will be in position to be engaged by their latches.

It is obvious that a trap such as has been described may be readily kept clean; that it is simple, durable, and economic, and that it will offer great temptation to animals, as the bait is visible not only from the outside but from any point within the trap, but can upon no account be reached; also, that an animal when approaching the bait from the right direction will be precipitated into the prison compartment. It is further evident that an animal entering at one end of the trap can practically see through to the opposite end.

Having thus described our invention, we claim as new and desire to secure by Letters Patent—

1. In a trap, the combination, with a chambered body portion provided with openings at its ends, of a horizontally-located partition extending within the body of the trap from end to end and terminating at the openings, the said partition being provided with openings normally closed by counterbalanced trap-doors, and cover-doors for bridging over the trap-doors, substantially as shown and described.

2. In a trap, the combination, with a body having tapering ends and an opening at each end, of a partition extending through the trap from side to side and from end to end, the extremities of the partition resting upon the base-wall of the body, counterpoised trap-doors normally closing openings in the partition, said trap-doors opening downward, stops limiting the downward movement of the trap-doors, cover-doors capable of bridging the trap-doors, and means, substantially as described, for holding the cover-doors in an elevated position, as and for the purpose set forth.

3. In a trap, the combination, with a body portion the extremities of which are beveled downward and each provided with an opening, of a partition dividing the body into an upper and lower compartment, the partition extending downward to the base-wall of the body, a runway or arch located upon a portion of the partition, baffle-partitions located at the sides of the arch and extending above it, counterpoised trap-doors normally covering the openings in that portion of the partition within the arch, said trap-doors being adapted to open downward, cover-doors pivoted between the trap-doors within the arch and capable of bridging said doors, and devices for maintaining the cover-doors in an elevated position, substantially as and for the purpose set forth.

4. In a trap, the combination, with a body constructed of reticulated or perforated material having tapering ends and an opening at each end, of a partition of a reticulated or perforated material dividing the interior of the trap into two main compartments, an upper and a lower, a runway or arch of reticulated or perforated material located upon the partition at a point in its length, counterpoised trap-doors covering openings produced in the partition within the runway, stops adapted for engagement with the trap-doors, baffle-partitions of reticulated or perforated material located at the sides of the arch or runway and extending above it, cover-doors pivoted between the trap-doors, curved upward and outward in opposite directions, the said cover-doors being constructed of a reticulated or perforated material, and devices for maintaining the cover-doors in an elevated position, whereby that portion of the arch or runway inclosed by the cover-doors may be maintained as a bait-chamber, rendering the said bait non-accessible and yet visible from all points, substantially as described.

EDWIN R. KNECHT.
CHARLES W. KNECHT.

Witnesses:
  REU. L. GARIS,
  WM. H. CRAIG.